Sept. 9, 1958    N. D. THOMPSON ET AL    2,851,119
SPRING SUSPENSION FOR INDUSTRIAL TRUCKS
Filed April 11, 1957    2 Sheets-Sheet 1

INVENTORS
NORMAN D. THOMPSON
JAMES S. GRUVER
BY
ATTORNEY

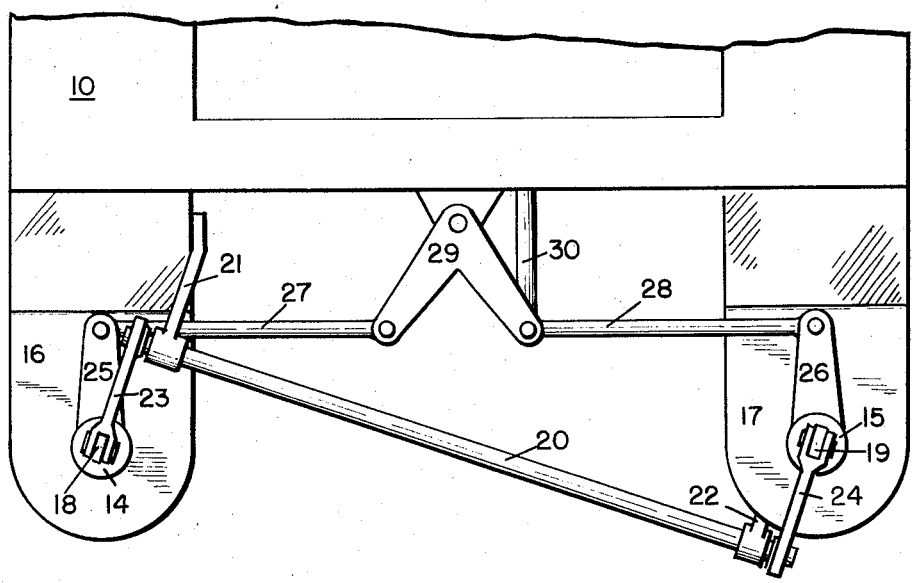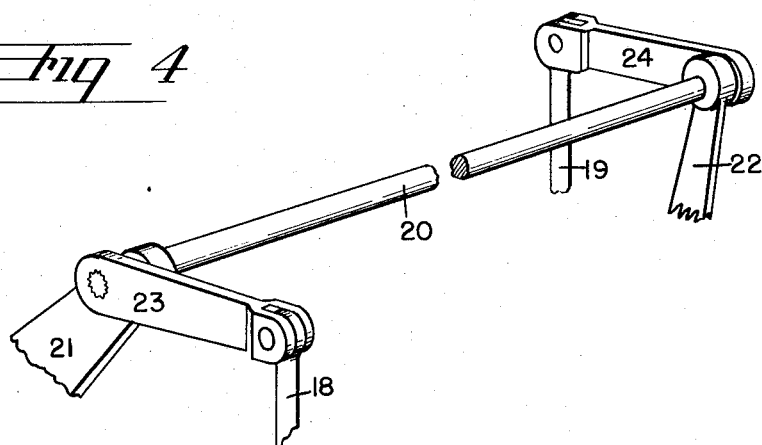

United States Patent Office 2,851,119
Patented Sept. 9, 1958

2,851,119

SPRING SUSPENSION FOR INDUSTRIAL TRUCKS

Norman D. Thompson and James S. Gruver, Dallas, Oreg., assignors to Gerlinger Carrier Co., Dallas, Oreg., a corporation of Oregon Application April 11, 1957, Serial No. 652,182

1 Claim. (Cl. 180—54)

This invention relates in general to equalizing and cushioning spring suspensions arranged for connecting a pair of wheels on opposite sides of an industrial truck and the like, and, more specifically, relates to a spring suspension for vehicle wheels of the "caster" type.

In particular, the present invention relates to caster-type steering wheels as employed in certain types of industrial trucks.

An object of the present invention is to provide an improved and simplified equalizing suspension suitable for four-wheel industrial trucks which will, in effect, produce a three-point wheel suspension, thus enabling the truck wheels to accommodate themselves to, and to provide proper traction over, uneven ground.

Another object of the invention is to provide a cushioning and equalizing spring suspension between a pair of oppositely-located caster-type wheels.

A further object is to provide a practical suspension for a pair of caster-type steering wheels on a truck, through the medium of which loads on the wheels will be equalized, the shocks to which the wheels are subjected when travelling over the regular ground surface will be cushioned, and with which the wheels will also be able to function properly and constantly as steering wheels under all normal conditions of truck usage.

The manner in which these objects are attained with the employment of the invention will be briefly described with reference to the accompanying drawings, wherein:

Figure 3 is a top plan view of the spring suspension and steering connection between the two rear wheels of the truck of Figure 1; and Figure 4 is a fragmentary perspective view illustrating the manner of operation of the torsion spring in the wheel assembly.

Figure 1:
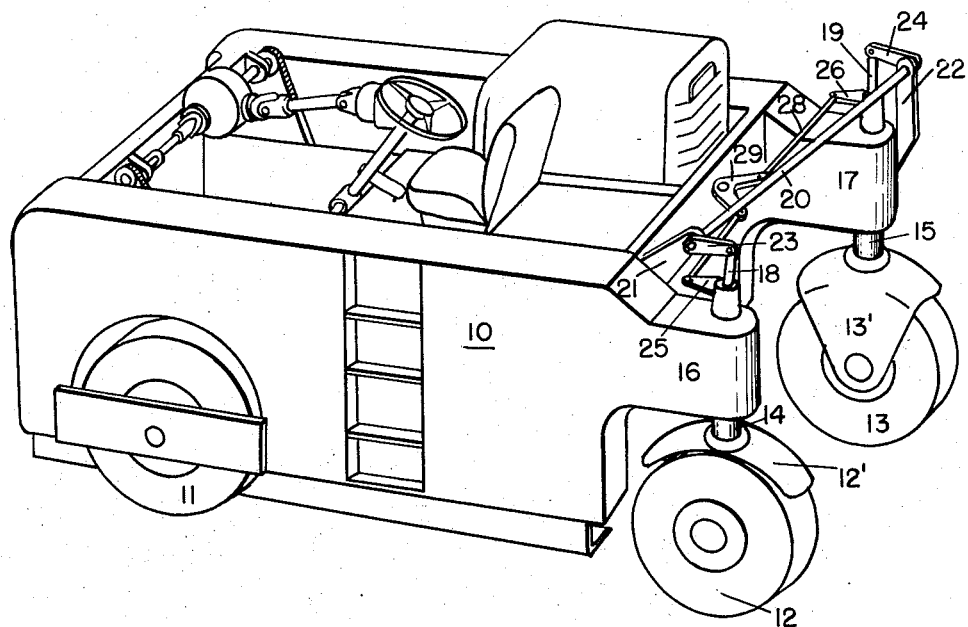
Figure 1 is a perspective view of a well-known straddle-type industrial truck equipped with a rear steering wheel spring suspension embodying the present invention.

In Figure 1, the body of an industrial truck is indicated in general by the reference character 10, the truck illustrated being of the type familiarly known as straddle-type. In this truck the two front wheels, one of which is shown at 11 in Figure 1, are the power-driven wheels, while the two rear wheels 12 and 13 serve as the steering wheels.

The two rear steering wheels 12 and 13 are of the caster-type, and are carried by single fork mounts indicated at 12' and 13' respectively. These single fork mounts include integral, upwardly-extending spindles 14 and 15 respectively. These spindles extend upwardly through suitable bearing sleeves which are secured in the rearwardly-extending truck frame brackets 16 and 17. However, the spindles 14 and 15, instead of being merely rotatable in their respective mountings in the extended brackets 16 and 17, are also slidable up and down in their mountings.

A torsion spring bar 20 (see also Figure 3) extends across the rear of the truck, positioned in a horizontal plane spaced above the plane of the top of the extended brackets 16 and 17. For reasons presently apparent this torsion spring bar 20 is arranged obliquely with respect to a line connecting the top ends of the two spindles 14 and 15 instead of being parallel thereto.

A pair of identical arms 23 and 24 are rigidly secured to opposite ends of the torsion spring bar 20 respectively. These arms extend in substantially opposite directions from the respective ends of the torsion spring bar 20 and act as crank arms in causing partial rotation and/or torsional twisting of the bar 20. The arm 23 is pivotally connected at its outer end to a link 18 extending upwardly from the spindle 14, and the arm 24 similarly is pivotally connected at its outer end to an identical link 19 extending upwardly from the spindle 15.

The torsion spring bar 20 is so positioned that normally the links 18 and 19 will be substantially vertical. The torsion spring bar 20 is rotatably supported near one end in a bracket arm 21 which is rigidly secured on the truck frame substantially in the position illustrated in the drawings, and at the opposite end the bar 20 is rotatably supported in the bracket arm 22, rigidly secured on, and extending upwardly from, the rear bracket extension 17 of the truck frame.

The two links 18 and 19 are mounted on the respective spindles 14 and 15 by means of ball and socket joints, so as to provide universal joint connections. Since both links are identical and their ball and socket joint connections with the spindles are identical it will suffice to describe the ball and socket mounting for the link 18, which is shown in Figure 2.

Figure 2:
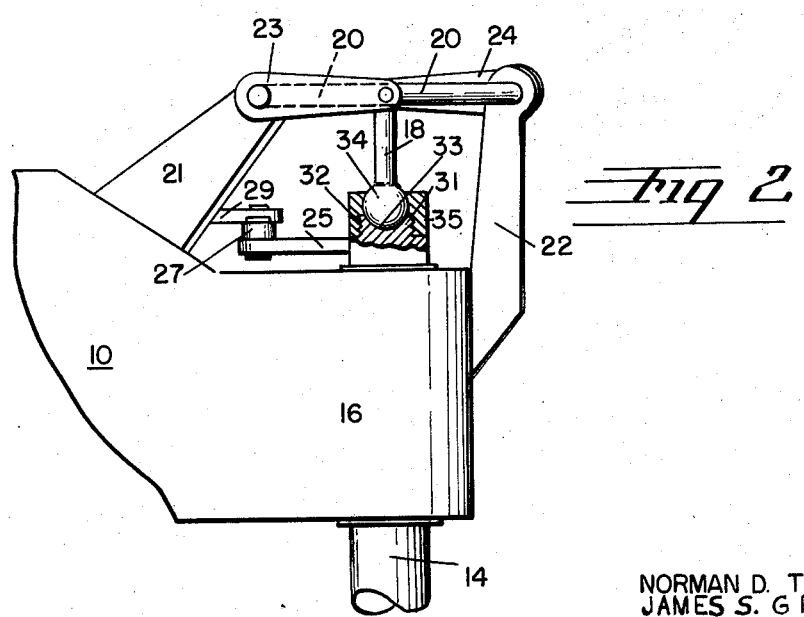
Figure 2 is a fragmentary side elevation of the rear portion of the industrial truck of Figure 1, the view being taken from the near side of Figure 1 and drawn to an enlarged scale, with a portion of the top of the spindle of one of the steering wheels broken away for clarity.

The upper end of each of the spindles 14 and 15, and thus the upper end of spindle 14, as shown in Figure 2, is formed with a reduced diameter portion 31 having a threaded outer periphery 32, and this portion has a concave top surface 33, the radius of curvature of which corresponds to the radius of the ball 34, which ball 34 forms the bottom end of the link 18. A cap 35, adapted to be screwed down on the top portion 31 of the spindle, has a central opening the wall of which corresponds to a zone on the spherical surface of the ball 34. Thus the cap 34, together with the concave top of the spindle portion 31, forms the socket for the ball 34, and the ball and resulting socket provide the universal joint by which the link 18 is connected to the spindle 14 (and similarly the universal joint by which the link 19 is connected to the spindle 15).

Since the spindles 14 and 15 for the wheels 12 and 13 are slidable up and down in their mountings, as well as being rotatable in the same, both spindles exert upward thrusts on the oppositely extending arms 23 and 24 secured to the ends of the torsion bar 20. This arrangement, as apparent, will result in the upward thrusts from the two spindles being equalized and the upward or downward movement of one spindle being compensated by downward or upward movement of the other spindle, without taking into consideration any spring action on the part of the torsion bar 20. In other words, under normal conditions, the loads on the two wheels 12 and 13 will be equalized, the wheels will automatically become raised or lowered when they pass over irregularities in the ground, but at all times will remain in contact with the ground. At the same time, should engagement of the front driving wheels of the truck with the irregularities in the ground cause the truck frame to be tipped slightly to one side or the other, the rear wheels 12 and 13 will automatically adjust themselves to this condition also and thus combine to produce in effect a three-point wheel suspension for the entire truck. As a result, frame stress on the truck when passing over rough ground is reduced, while all four wheels maintain traction contact with the ground.

Thus far the operation of the suspension has been described without reference to the ability of the equalizing bar 20 to serve also as a torsion spring. It will be apparent, however, that, as a result of this faculty, any sudden upward thrust on either or both spindles will be cushioned by the ability of the bar 20 to receive a torsional twist, and in this way the two movable spindles and the inter-connecting means including the torsion bar provide the desired spring suspension as well as an equalizing suspension.

A pair of identical steering arms 25 and 26 are firmly secured to the spindles 14 and 15 respectively, substantially parallel to each other. Links 27 and 28 connect these arms respectively with the pivotally mounted steering lever 29, and this lever 29 is connected through the steering rod 30 (Figure 3) and other interposed means (not shown) in the customary manner with the steering wheel mounted on the truck as usual adjacent the driver's seat. The pivotal connections at the ends of links 27 and 28 are so arranged as to permit these links to slope slightly either up or down from their normal horizontal plane sufficiently to accommodate themselves to any momentary up or down movement of the spindles 14 and 15.

Thus the rear wheel assembly is able to perform the multiple function of steering the truck, of equalizing the load on the steering wheels, of cushioning shocks to the truck frame transmitted through the rear wheels, and of enabling all four wheels of the truck to maintain proper ground traction without excessive strain on the truck frame.

We claim:

In an industrial truck of the character described, a pair of driven front wheels and a pair of rear steering wheel assemblies, each of said rear wheel assemblies consisting of a caster-type wheel having a mount secured to the lower end of a vertical spindle, a pair of rearwardly-extending wheel brackets on the frame of said truck, bearings in said brackets for said spindles respectively, said spindles extending upwardly through said brackets and rotatably and slidably mounted in said bearings, a torsion bar spaced above said brackets and extending obliquely across said truck, a pair of support brackets for said bar mounted on opposite sides of said truck and rotatably supporting said bar at its ends, a pair of identical crank arms secured to the ends of said bar respectively extending in substantially opposite directions and terminating above the top ends of said spindles respectively, a pair of identical links extending upwardly from the top ends of said spindles to the ends of said crank arms respectively and pivotally connected to said crank arms, the lower ends of said links secured to the top ends of said spindles by ball and socket joints, and steering means interconnecting said spindles for rotating said spindles in unison.

References Cited in the file of this patent

UNITED STATES PATENTS

| | | |
|---|---|---|
| 2,147,025 | Garnett | Feb. 14, 1939 |
| 2,404,121 | Black | July 16, 1946 |